Sept. 24, 1946.   E. M. DELORAINE ET AL   2,408,048
RADIO DIRECTION METHOD AND SYSTEM
Filed Aug. 28, 1942   3 Sheets-Sheet 1

INVENTORS
EDMOND M. DELORAINE
EMILE LABIN
BY
ATTORNEY

Sept. 24, 1946.    E. M. DELORAINE ET AL    2,408,048
RADIO DIRECTION METHOD AND SYSTEM
Filed Aug. 28, 1942    3 Sheets-Sheet 2

INVENTORS
EDMOND M. DELORAINE
EMILE LABIN
BY
ATTORNEY

Patented Sept. 24, 1946

2,408,048

UNITED STATES PATENT OFFICE 2,408,048

RADIO DIRECTION METHOD AND SYSTEM

Edmond M. Deloraine and Emile Labin, New York, N. Y., assignors to Federal Telephone and Radio Corporation, a corporation of Delaware Application August 28, 1942, Serial No. 456,499

8 Claims. (Cl. 250—1)

1

This invention relates to radio indicating arrangements and methods and more particularly to a method and system for guiding aircraft without the use of much, if any, additional equipment thereon.

In a previously proposed system an arrangement is described for indicating the position of an aircraft relative to a course line by the use of widely spaced transmitting stations and separate receiver equipment on board the aircraft. This system is described in the copending application of Emile Labin, Serial No. 400,259, filed June 28, 1941, entitled "Course beacon."

It is an object of this invention to provide a system and method having the accuracy of the arrangement outlined above but requiring on board the craft only the normal radio communication equipment.

Another object of the invention is to provide an arrangement by which the aircraft may be informed not only of its position relative to the course line but its distance therealong.

It is a further object of our invention to provide a radio guiding system that will serve to give accurate location signals over long distances on board an aircraft.

According to a principal feature of our invention, we provide on the aircraft normal communication equipment preferably consisting of pulse modulation transmitter and receiver equipment. On the ground or other relatively fixed points are provided two widely spaced receivers. Accordingly, if the pilot of an aircraft wishes to know his position he merely requests of the ground station that they inform him of his position after which he transmits pulse signals preferably carrying no other message. These pulse signals are picked up at the widely spaced receiver points and are used to determine the course position of the craft after which this information is transmitted on the normal communication channel to the craft. If distance as well as course line position is desired the receiving stations may be in the form of direction finding stations so that the position may be determined by triangulation. Preferably, however, the land stations do not depend upon direction finders for obtaining the distance but instead use a reflective energy distance determining system. This latter system may require additional repeater equipment on the aircraft but such additional equipment need not be a separate receiver but may utilize the existing communication transmitter and receiver equipment.

A better understanding of our invention and the objects and feature thereof may be had from the particular description thereof made with reference to the accompanying drawings in which.

Figure 1:
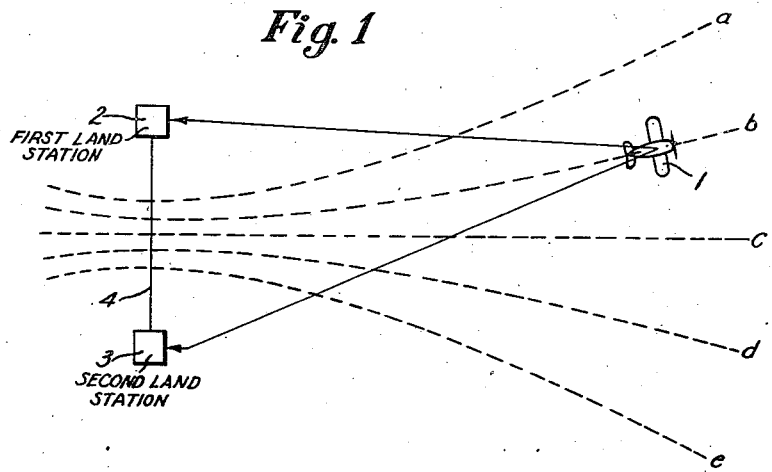
Fig. 1 illustrates the general layout of the directing equipment.

Turning first to Fig. 1, an aircraft is illustrated at I cooperating with two fixed land stations 2 and 3. Stations 2 and 3 are preferably interconnected by means of a transmission line 4. It will be understood that the signals from I received at spaced points 2 and 3 may be combined in any time relationship. The signals from the plane, if it is on the center line *c*, will arrive at both stations 2 and 3 at the same time since the distance from the craft to the two stations is the same. Curves *a*, *b*, *d* and *e* are other curves representing a fixed time difference of arrival of signals from craft I at stations 2 and 3. Preferably, the aircraft will follow the center course line *c* as this is the shortest path. However, by maintaining the proper difference in time of arrival of the signals the other ones of the curves such as *a*, *b*, *d* or *e* may be used. It will be recognized that the pattern described above in connection with Fig. 1 is a family of hyperbolar and corresponds substantially to the pattern produced in the transmitter arrangement described in the previously mentioned copending application, Serial No. 400,259.

Figure 2:
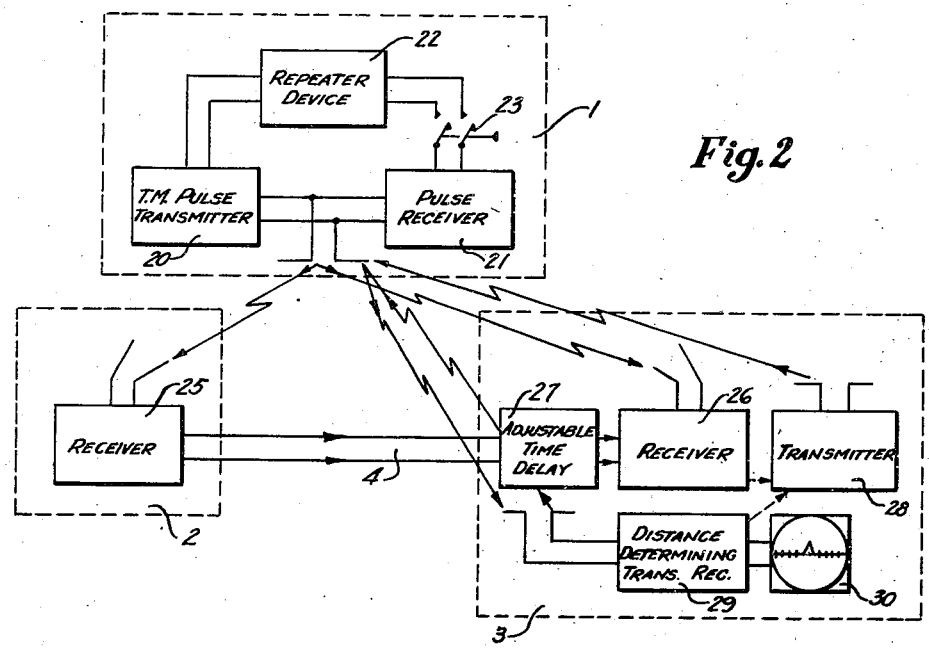
Fig. 2 is a general block diagram of the transmitter and receiver equipment on the craft and at the fixed stations.

In Fig. 2 is shown more clearly the combination of apparatus at the stations I, 2 and 3 of Fig. 1. On the aircraft at I is provided the normal pulse transmitter 20 and pulse receiver 21. These devices are preferably of the time modulated pulse transmission type described quite fully in U. S. Patents Nos. 2,256,336, 2,265,337, 2,266,401 or in the copending applications of Emile Labin, Serial Nos. 386,282 and 449,595 filed April 1, 1941, and July 3, 1942. For long distance operation the carrier wavelength should be in the short wave band of say between 10 and 100 meters. In addition, a repeater device 22 and a switch 23 may be provided for purposes to be described more fully later.

When the pilot wishes to have an indication of his position he may first communicate with the ground station shown at 3 by means of normal time modulated pulse transmissions asking them to give him his bearings. After this request has been acknowledged he again transmits a series of impulses from the transmitter 20. These impulses are received at both stations 2 and 3 by receiver arrangements 25, 26. The impulses received at 25 are conducted over transmission line 4 and an adjustable time delay network 27 to receiver 26. From the combination of these two signals in receiver 26 the course position of the aircraft is determined. Then from transmitter 28 this information is sent to the craft where it is received on the normal pulse receiver 21.

If distance determination as well as the position relative to the course is desired, this may be then obtained by use of the distance determining transmitter receiver equipment 29 and indicator 30. In order to obtain this distance indication the pilot after sending out the pulses for course determination ceases his transmitting and closes switch 23 connecting repeater devices 22 between receiver 21 and transmitter 20. At the ground station then distance determining signals are transmitted from 29. These signals are received on 21 and serve to control repeater device 22 to operate the transmitter and send back repeated signals. These repeated signals are then received on the distance determining device 29 and in a known manner distance indication may be made on the screen of indicator 30. For the purposes of distance indication any known type of reflected or repeated energy distance finding systems may be used. Such types of systems are more fully illustrated in copending applications of Henri G. Busignies, Serial No. 382,390, filed March 8, 1941, entitled "Impulse translating system," Emile Labin, Serial No. 406,499, filed August 12, 1941, entitled "Pulse transmitters," and Roy C. Hopgood, Serial No. 435,873, filed March 23, 1942, entitled "Instrument navigation system."

The system generally outlined above is preferable for the purpose of accurate guiding of aircraft, particularly at great distances. However, in accordance with our invention, instead of utilizing a time comparison arrangement for course determination both receivers 25 and 26 may be provided with directively sensitive antennae arrangements and the position of the aircraft may be determined by the directive readings at the spaced receivers and triangulation.

It should be understood that for the purpose of guiding the aircraft over long distances such as transoceanic travel ultra short-wave apparatus cannot readily be used. Preferably, the equipment used in the system described herein is within the short-wave band between 10 and 50 meters. The spacing between the fixed installations is generally greater than 25 wavelengths and may be a distance of 25 to 100 miles when long distance flights are to be controlled.

Figure 3:
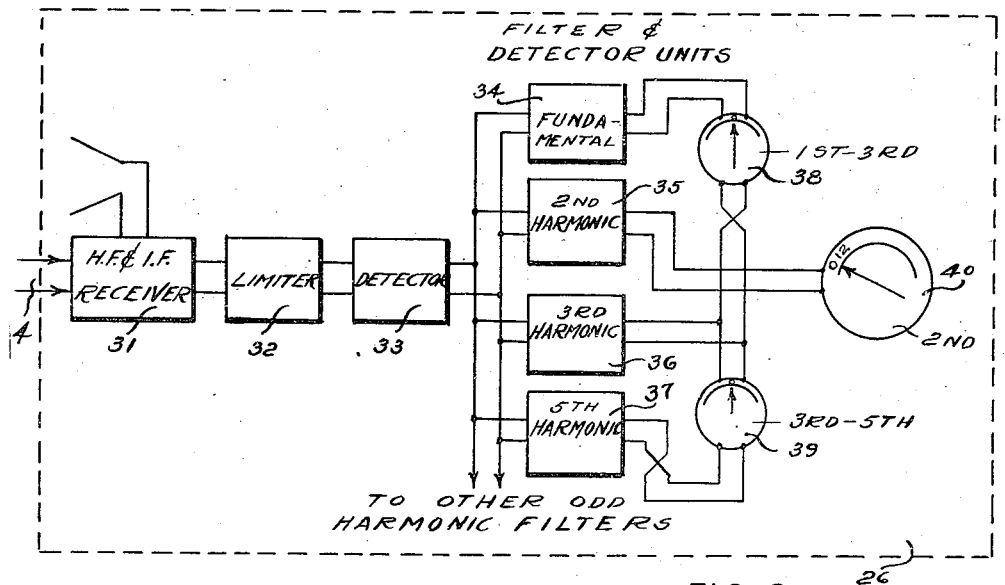
Fig. 3 is a more detailed diagram of a preferred type of receiver equipment.
Figure 4:
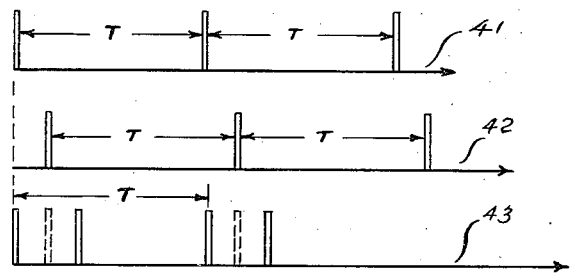
Fig. 4 is a diagram illustrating the pulse reception for course determination.
Figure 5:
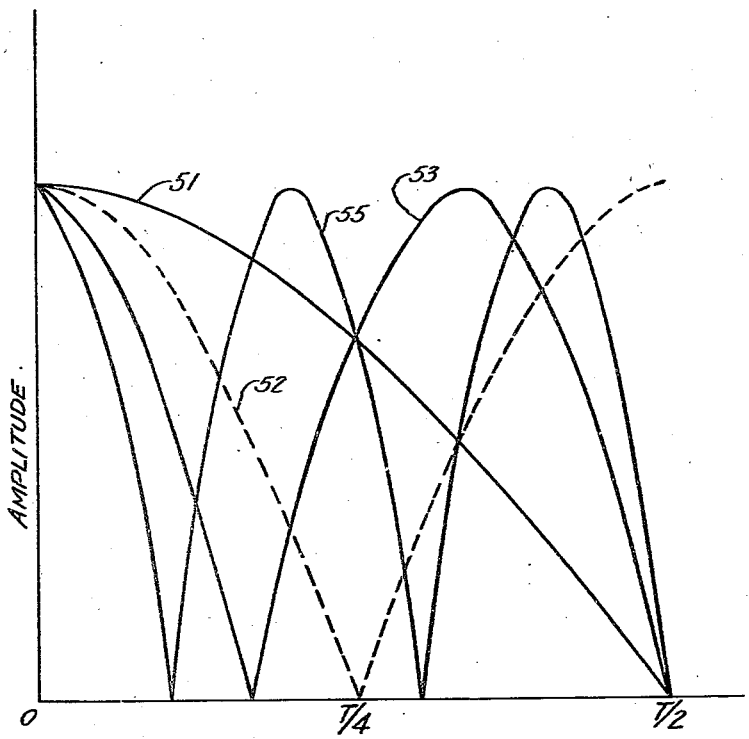
Fig. 5 is a set of curves further explaining the operation of the system.

A more complete understanding of the preferred course indicating arrangement may be had by reference to Figs. 3, 4 and 5 which illustrate a system using the general principles of the directing arrangement described in the copending application Serial No. 400,259. In Fig. 3 is shown equipment which may constitute the receiver 26 of Fig. 2. This comprises the high and intermediate frequency receiver portion 31 which serves to receive not only the impulses directly at 26 but also to receive those transmitted (preferably at intermediate frequency) from 25 over line 4. The output of receiver 31 is passed through an amplitude limiter 32 after which the impulses (i. e. brief trains of I. F. waves) are detected in 33 and applied to filter-detector units 34, 35, 36 and 37 tuned to pass the fundamental, second harmonic, third harmonic, and fifth harmonic, respectively, and to convert these passed harmonics into direct currents. Detector 33 may incorporate multivibrator apparatus as disclosed in the application of Emile Labin, Serial No. 449,595, filed July 3, 1942, and thus serve to cut out reflected impulses which occur within the tripped condition of the multivibrator. The outputs from these harmonic filter-detector units are applied to indicator instruments 38, 39 and 40 to produce the desired indications. In order that the operation of these indicators may be better understood, reference is made to Figs. 3 and 4. In Fig. 4 the impulses of curve 41 may indicate those received at receiver 25. It should be noted that the impulses are separated by a period T, the period of the transmitter 20. Curve 42 represents the impulses coming directly from the plane to 26 also separated from one another by the period T. These signals are combined in receiver 26 and form pairs of impulses as shown by curve 43 which pairs are still separated by the period T.

The dotted line indications of curve 43 show the relative position of impulses received at 26 from receiver 25 without any phase adjustment. This indicates that the aircraft is not on the center course position but is off to one side, for example, on curve b as shown in Fig. 1. In order to obtain the position measurement the adjustable phase network 27 (Fig. 2) may be adjusted so that the impulses are in the desired phase position shown in the solid lines at 43. The phase delay network may be calibrated so that the adjustment necessary to achieve this desired relationship indicates the amount of the deviation from the course.

In Fig. 5 is shown the time position of the fundamental and harmonic curves corresponding to those passed by the filters of Fig. 3. The fundamental curve is represented by 51, the second harmonic curve by the broken line 52, the third harmonic by curve 53 and the fifth harmonic by curve 55. As fully explained in the aforementioned Emile Labin application, Serial No. 400,259, if the impulses are made very sharp the amplitude of all of the harmonics within the usable range are substantially equal in magnitude. Accordingly, position of the craft may be quite precisely determined by a comparison of amplitudes of these harmonic curves. For a desired course line delay device 27 (Fig. 2) is so adjusted that the space between the impulses received at 25 and 26 is a predetermined amount. The harmonics will then be such that the course line may be determined by equality of different phases. The phase relation chosen is preferably one such that one harmonic is zero and several predetermined ones of the remaining harmonics overlap at equal amplitudes at this same point. For the purposes of simplicity the particular relationship such that the normal delay is T/4 has been chosen for illustrating the invention. It will be noted that at the particular pulse spacing position produced by a delaying of T/4 all of the odd harmonics cross one another at zero value of the second harmonic. Accordingly, a course line is defined by the first and third harmonics as shown at 51, 53 and a still sharper course by the third and fifth as shown by curves 53, 55. There is also an intersection between curves 51 and 55 which might be used but since the slope of both these curves is in the same direction, the indication will not be very sharp. When the arrangement is adjusted to have a period of T/4 it is preferable that the meter readings be such as to compare the amplitude of harmonics in the range 4N+1 with those of the range 4N+3, N being any integer. Thus, in this series the first, fifth, ninth, thirteenth, etc., harmonics are compared with one of the third, seventh, eleventh or fifteenth, etc., harmonics to produce the guiding indication. The comparison of the signals for the purpose of obtaining the course position may be made in the instruments such as 38, 39 of Fig. 3. Meter 38 shows the amplitude relationship between the first and third harmonics while meter 39 shows the relationship between the third and the fifth.

The second harmonic indication is received on meter 40 and is used as a rough check to indicate the course line and avoid other false courses which might be obtained if only a comparison of the odd harmonics were used. This will be quite clear from a reference to Fig. 5 which shows that the third and fifth harmonics intersect at several points but only one of these points coincides with the zero position of second harmonic 52.

This particular type of system is very useful for long distance guiding of aircraft since the further the aircraft has departed from the measuring station the more accurate the indications. Thus, a quite exact location of the craft even at great distances may be achieved.

Figure 6:
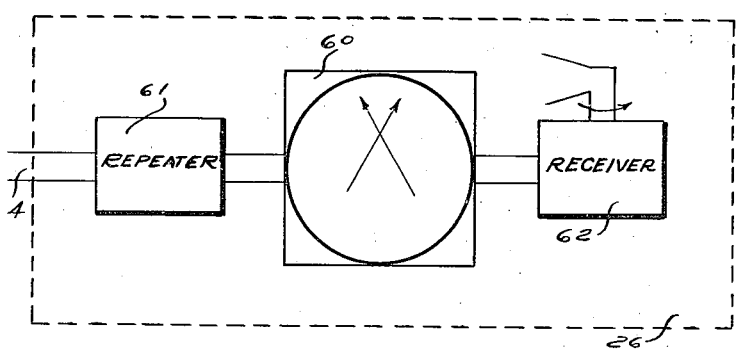
Fig. 6 is an illustration of an alternative receiver equipment for use in the ground stations of my system.

Instead of using the course and distance indication system described above, or as an alternative system for checking the position, directional antenna units may be provided at both receiving points. With the directional arrangement, however, independent indications of the direction of the craft with respect to each of the receiving stations may be obtained. Since pulse modulation is used, the systems for direction finding are preferably made to respond in such a manner that the first received pulse may be distinguished from any later received pulses which may arrive after reflection from the Heaviside layer or other objects. Accordingly, the directive line may be obtained quite accurately. A number of known types of direction finders for indicating the direction of the first received signal are already known so no specific description of such equipment is given herein. These received signals may be combined as shown in Fig. 6 on a common indicating dial 60 to give directly by triangulation the position of the craft both as to distance from the stations and location with respect to a desired course. Since the signals from receiver 25 are transmitted a considerable distance in line 4 a repeater device 61 may be arranged in the line to amplify these signals before application to the indicator 60. The other directionally received signals may be applied over receiver 62 to the indicator. Although the instrument arrangement shown in Fig. 6 may be used more accurate indications may be obtained in some instances by graphical plotting of directional indications.

The information as to the position of the aircraft regardless of how it is obtained, is then retransmitted to the receiver on the craft so that the pilot may be notified of his exact position or his position relative to the fixed course.

While we have described our invention with the particular embodiments therein it should be understood that many changes and modifications may be made therein without departure from the spirit of our invention. It is clear that instead of following the equi-signal or straight line course the pilot may choose to follow one of the other courses. By proper adjustment of the delay network 27 in the receiving system any desired course on the curved lines between the stations may be followed by the craft. Furthermore, two or more of these indicating stations may be arranged to provide an intersection position when it is desired that craft be precisely located with respect to some objective. This arrangement might be particularly useful for guiding aircraft on the long range bombing expeditions. It is considered, however, that the more useful purpose of the present invention is that of guiding planes for long flights such as those currently used by the bomber ferry command in delivering planes over the long ocean routes.

What is claimed is:

1. The method of directing a craft along a given course, the craft being equipped with short wave carrier time modulated pulse transmitter and receiver equipment, and being directed by fixed radio installations of the time modulated pulse type, comprising transmitting time modulated pulses from said pulse transmitter equipment on said craft to said fixed installations to request an indication of course position, transmitting further pulses from said same pulse transmitter equipment on said craft, receiving said transmitted pulses at predetermined fixed points spaced apart at least twenty-five wavelengths at said carrier frequency, obtaining a differential of the time of receiving the first received component of said received pulses to determine the course position of said craft, transmitting information of said course position by time modulated pulses, and receiving said pulses on said craft whereby an accurate indication of the position of said craft relative to a desired course is obtained.

2. The method according to claim 1 wherein repeater equipment is provided on said craft, further comprising transmitting from one of said fixed installations distance determining signals, repeating said signals from said craft, receiving said repeated signals to determine the distance of said craft from said fixed installation and transmitting to the time modulation receiver of said craft the determined distance indication.

3. The method according to claim 1 further comprising directionally receiving said impulses at said spaced points, determining the geographic position of said craft by said directionally received signals, and transmitting information concerning said geographical position to said craft by pulse modulated signals.

4. The method according to claim 1 wherein repeater equipment is provided on said craft, further comprising transmitting from one of said fixed installations distance determining signals, repeating signals from said craft by causing operation of said pulse transmitter on said craft, receiving said repeated signals to determine the distance of said craft from said fixed installation, and transmitting to the time modulation receiver of said craft information of the determined distance.

5. The method of determining the geographical location of a craft following a given course, with the aid of time modulation apparatus positioned at two spaced fixed points, said craft being equipped with short wave carrier time modulated pulse transmitter and receiver equipment for normal communication, comprising transmitting time modulated pulses from said pulse transmitter equipment to request information as to location, transmitting further pulses from said pulse transmitter equipment on said craft, receiving said further transmitted pulses at said spaced fixed points, using the further received pulses at both of said points to determine the position of said craft with respect to said course, determining the distance of said craft from one of said fixed points by said further received signals, said distance being limited only by the range of the transmitter equipment on said craft, using said course position and distance determinations to determine the geographical location of said craft, and transmitting information concerning said geographical location to said craft by pulse modulation.

6. A system for directing craft along a given course, said craft being provided with short-wave carrier time modulation pulse transmitter and receiver communication equipment comprising two fixed radio installations spaced apart at least twenty-five wavelengths at said carrier frequency said installations each being provided with receiving means responsive to pulses transmitted from said craft, at least one of said installations being provided with means for two-way communication with said craft for receiving requests from said craft for position indication information, means at each of said installations for receiving pulses transmitted by said transmitter of said craft, means for using the first received of said received pulses to provide an indication of course position of said craft, said last means comprising comparison means for comparing the time of reception of said first received pulses at said two installations, and means for transmitting said information of said provided indication to said craft so that the course position of said craft may be known thereon.

7. A system according to claim 6, further comprising distance signal transmitter and receiver means at one of said fixed installations for transmitting distance determining signals, receiver repeater means on said craft responsive to said distance indicating signals, and means on said craft responsive to said received distance indicating signals for causing said transmitter equipment to transmit signals to said distance receiver means to indicate the distance of said craft from said fixed installation.

8. A system according to claim 6, further comprising means forming a part of at least one of said installations for determining the distance of said craft with respect to said installation.

EDMOND M. DELORAINE.
EMILE LABIN.